US009092905B2

(12) United States Patent
Moriyama et al.

(10) Patent No.: US 9,092,905 B2
(45) Date of Patent: Jul. 28, 2015

(54) CURVE RENDERING DEVICE, CURVE RENDERING METHOD, CURVE RENDERING PROGRAM, AND INTEGRATED CIRCUIT

(75) Inventors: Takaaki Moriyama, Osaka (JP); Yasuhiro Ito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 304 days.

(21) Appl. No.: 13/699,157

(22) PCT Filed: Apr. 13, 2012

(86) PCT No.: PCT/JP2012/002590
§ 371 (c)(1),
(2), (4) Date: Nov. 20, 2012

(87) PCT Pub. No.: WO2012/140910
PCT Pub. Date: Oct. 18, 2012

(65) Prior Publication Data
US 2013/0100138 A1  Apr. 25, 2013

(30) Foreign Application Priority Data
Apr. 15, 2011  (JP) .................... 2011-090772

(51) Int. Cl.
*G06T 11/20* (2006.01)
*G09G 5/28* (2006.01)
*G06F 17/17* (2006.01)

(52) U.S. Cl.
CPC .............. *G06T 11/203* (2013.01); *G06F 17/17* (2013.01); *G09G 5/28* (2013.01)

(58) Field of Classification Search
CPC combination set(s) only.
See application file for complete search history.

(56) References Cited

U.S. PATENT DOCUMENTS 5,381,521 A * 1/1995 Ballard .......................... 345/442
5,408,598 A * 4/1995 Pryor, Jr. ...................... 345/442
(Continued)

FOREIGN PATENT DOCUMENTS

CN  1237739 A  12/1999
CN  101714261 A  5/2010
(Continued)

OTHER PUBLICATIONS

International Search Report issued Jul. 17, 2012 in corresponding International Application No. PCT/JP2012/002590.
(Continued)

*Primary Examiner* — Yuwen Pan
*Assistant Examiner* — Zhitong Chen
(74) *Attorney, Agent, or Firm* — Wenderoth, Lind & Ponack, L.L.P.

(57) ABSTRACT

A curve rendering device is provided which is capable of judging whether a further approximation process is necessary for an approximation curve obtained by an immediately previous approximation process, and includes: a path dividing unit for calculating segmentation points on a center line; an outline point calculating unit for calculating, for each of the segmentation points, two offset points; a judging unit for calculating a distance between offset points, and judging a ratio of the longer distance to the shorter distance is greater than a predetermined value; and a curve forming unit for approximating, between two partial outlines, the longer one of the two partial outlines by using a greater number of line segments than line segments used to approximate the shorter one of the two partial outlines when the ratio is judged to be greater than the predetermined value.

9 Claims, 9 Drawing Sheets

(56) References Cited

U.S. PATENT DOCUMENTS

| | | | |
|---|---|---|---|
| 5,673,371 A * | 9/1997 | Koopman et al. | 358/1.11 |
| 6,295,072 B1 | 9/2001 | Pon et al. | |
| 6,501,475 B1 * | 12/2002 | Cheng | 345/467 |
| 6,512,847 B1 * | 1/2003 | Gnutzmann | 382/173 |
| 8,643,650 B1 * | 2/2014 | Vinchon et al. | 345/442 |
| 2010/0097382 A1 | 4/2010 | Nystad et al. | |
| 2011/0285719 A1 * | 11/2011 | Kilgard et al. | 345/442 |

FOREIGN PATENT DOCUMENTS

| | | | | |
|---|---|---|---|---|
| EP | 1 630 745 A2 | 1/2006 | | |
| JP | 4-174494 | 6/1992 | | |
| JP | 7-85293 | 3/1995 | | |
| JP | 1995-085293 | * | 3/1995 | G06T 11/20 |
| JP | 1995-85293 | * | 3/1995 | G06T 11/22 |

OTHER PUBLICATIONS

Chinese Office Action and Search Report issued Mar. 20, 2015, in Chinese Application No. 201280001516.7 (with English translation of the Search Report).

Zhou Tianxiang et al., "Fast Draw Bézier Curves," Journal of computer-Aided Design & Computer Graphics, vol. 14, No. 6, Jun. 30, 2002, pp. 501-504 (with English abstract).

* cited by examiner (When n = 3)

(When n = 0)

(When n = 1)

(When n = 2)

CURVE RENDERING DEVICE, CURVE RENDERING METHOD, CURVE RENDERING PROGRAM, AND INTEGRATED CIRCUIT

TECHNICAL FIELD

The present invention is directed to a curve rendering technique for rendering curves in the outlines of characters and geometric figures by approximating curves with a plurality of line segments.

BACKGROUND OF INVENTION

Background Art

In recent years, curves of text fonts or geometric figures are rendered using vector graphics techniques involving approximating curves in an outline with a plurality of line segments and filing a region inside the outline defined by the line segments. The quality of characters or geometric figures is determined depending on the smoothness of the connecting portions of approximating line segments (hereinafter, such a connecting portion is referred to as an edge). When the initial approximation process results in an edge not sufficiently smooth, the edge is corrected through further approximation to define a smoother curve. As described above, a judgment of whether or not edges requires further approximation is made separately for each edge and thus can be said as a frequently executed process. Patent Literature 1 discloses a technique for judging the need for further approximation based on whether or not the angle between two line segments connected to form an edge satisfies an empirically determined condition.

CITATION LIST

Patent Literature

[Patent Literature 1]
Japanese Patent Application Publication No. 4-174494

SUMMARY OF INVENTION

Thanks to the improvement in display capability, it is becoming common that information processing terminals with relatively limited computing power employ the vector graphics techniques for rendering characters and geometric figures. However, the processing related to vector graphics is computationally expensive and delay in the processing tends to cause visual discomfort to the users. Therefore, the process of judging the need for further approximation is required to be simple and computationally inexpensive so as not to cause any processing delay even with the limited computing power.

However, while being able to duly judge the need for further approximation, the conventional technique cited above is associated with the problem of requiring calculating the angle between two line segments forming each edge, which naturally involves complex computations such as an inverse trigonometric function and the like.

In view of the above problems, an object of the present invention is to provide a curve rendering device for judging the need for further approximation in a simple and computationally less expensive manner than a conventional manner.

To achieve the object stated above, the present invention provides a curve rendering device for rendering a curve, which has a width and defined by a center line and a line width, by linear approximation of an outline of the curve. The curve rendering device includes: a segmentation point calculating unit configured to calculate a plurality of segmentation points on the center line for segmenting the center line; an offset point calculating unit configured to calculate, for each of the segmentation points, two offset points separated from the segmentation point by an equal distance on a normal to the center line at the segmentation point; a distance calculating unit configured to calculate a distance between offset points in each of two pairs selected from four offset points calculated for two adjacent segmentation points, the offset points in each pair being located on a same side with respect to a straight line connecting the two adjacent segmentation points; a judging unit configured to calculate a ratio between the calculated two distances using the shorter one of the distances as a denominator, and judge whether or not the ratio is greater than a predetermined value; and a curve forming unit configured to approximate, between two partial outlines which are portions of the outline delimited at the respective normals at the two adjacent segmentation points, the longer one of the two partial outlines by using a greater number of line segments than line segments used to approximate the shorter one of the two partial outlines when the ratio is judged to be greater than the predetermined value.

With the above configuration, the curve rendering device according to the present invention judges whether or not to use a greater number of line segments to approximate the longer one of the two partial outlines than the line segments used to approximate the shorter one of the two partial outlines, by comparing the distances between the two pairs of offset points. This processing is simple and computationally less expensive as compared with conventional processes.

DETAILED DESCRIPTION OF INVETNION

The following describes an embodiment of the present invention with reference to the accompanying drawings.

1. Embodiment 1

1-1. Overview

A curve rendering device according to an embodiment of the present invention renders a curve having a certain line width by approximating an outline of the curve with a plurality of line segments. The information given to the curve rendering device regarding the curve to be rendered includes (a) path information indicating the path which is a widthwise center line of the curve and (b) line width information indicating the line with of the curve.

Figure 1:
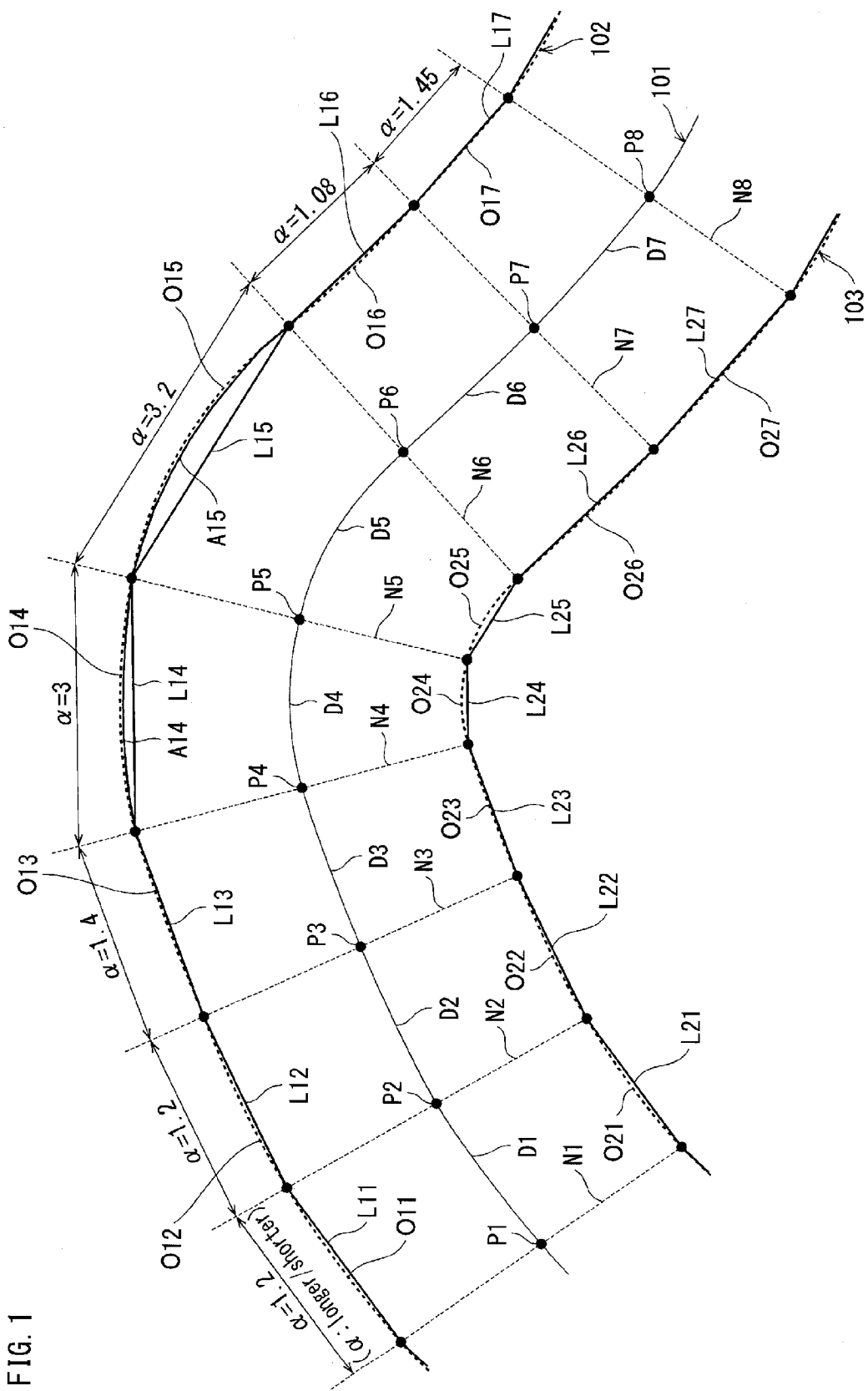
FIG. 1 is a view schematically showing a portion of a curve to be rendered according to an embodiment of the present invention.

FIG. 1 is a view schematically showing a portion of a curve to be rendered. In the figure, the reference signs 102 and 103 denote portions of the outline of the curve to be rendered, whereas the reference sign 101 denote a path that is a widthwise center line of the curve to be rendered. The outline 102 is separated from the path by half the line width (hereinafter, "half width") of the curve to be rendered. Similarly, the outline 103 is separated from the path by the half width.

To perform an approximation process, the curve rendering device first divides the path into path segments (denoted by "D1" through "D7" in the figure) of a predetermined length. The curve rendering device performs the approximation process separately for each path segment. Next, the curve rendering device calculates the normals (normals N1-N8) to the curve at the respective end points (segmentation points P1-P8) of the path segments. As shown in the figure, each normal intersects the outline. In the following description, each portion of the outline delimited by the normals is referred to as a "partial outline" (denoted by O11-O17 and O21-O27 in the figure). It is noted that the same set of normals at the two end points of any given path segment delimit two partial outlines that are oppositely located across the given path segment (hereinafter, such two partial outlines are referred to as "a pair of partial outlines corresponding to a given path segment"). For example, a pair of partial outlines corresponding to the path segment D5 is O15 and O25. Here, with respect to a pair of partial outlines, the longer one of the two line segments connecting the two end points of each partial outline is referred to as a "longer line segment", and the shorter one is referred to as a "shorter line segment".

For each path segment, the curve rendering device judges whether to approximate the longer one of the pair of partial outlines corresponding to a given path segment with a plurality of line segments or with a single line segment that connects the two end points of the partial outline (hereinafter, the judgment may also be referred to as "approximation judgment"). The curve rendering device makes this approximation judgment based on whether the ratio ($\alpha$) of the longer line segment to the shorter line segment of the pair of partial outlines corresponding to the path segment is greater than a predetermined value (two, for example), which is relatively simple computation. In the present embodiment, the curve rendering device always uses a single line segment to approximate the shorter one of the pair of partial outlines corresponding to a given path segment, which reduces the computational load required for the approximation process. In order to allow for the above arrangement, the length of path segments is determined to be short enough for ensuring that approximating a shorter partial outline corresponding to any path segment by using a single line segment results in a curve that is perceived on a display device or the like as a smooth curve by the user.

With reference to FIG. 1, a supplementary explanation is given for the above approximation judgment. In FIG. 1, the reference sign a denotes the ratio of the longer line segment to the shorter line segment for each path segment. For example, the ratio $\alpha$ of the longer line segment (L11) to the shorter line segment (L21) corresponding to the path segment D1 is 1.2. Consequently, the curve rendering device judges that the ratio $\alpha$ is not greater than 2. Thus, of the pair of partial outlines O11 and O21 corresponding to the path segment D1, the curve rendering device approximates the longer partial outline O11 with a single line segment L11. Similarly, with respect to each of the path segments D2-D3 and D6-D7, the curve rendering device judges that the ratio $\alpha$ is not greater than 2 and thus approximates the longer one of the pair of partial outlines corresponding to the path segment with a single line segment.

Yet, with respect to the path segment D4, the ratio $\alpha$ of the longer line segment (L14) to the shorter line segment (L24) is 3. Therefore, the curve rendering device judges that the ratio $\alpha$ is greater than 2. Consequently, the curve rendering device approximates the partial outline O14, which is the longer one of the pair of partial outlines O14 and O24 corresponding to the path segment D4, with an approximation curve A14 which is composed of a plurality of connected line segments. Also, with respect to the path segment D5, the ratio $\alpha$ of the longer line segment (L15) to the shorter line segment (L25) is 3.2. Therefore, the curve rendering device judges that the ratio $\alpha$ is greater than 2. Consequently, the curve rendering device approximates the partial outline O15, which is the longer one of the pair of partial outlines O15 and O25 corresponding to the path segment D5, with an approximation curve A15 composed of a plurality of connected line segments. Through the above processing, the curve rendering device generates, as an approximation curve for the outline 102, a sequence of line segments composed of the line segments L11, L12, L13, A14, A15, L16, and L17 connected together. Similarly, the curve rendering device generates, as an approximation curve for the outline 103, a series of line segment composed of the line segments L21, L22, L23, A24, A25, L26, and L27 connected together. The following now describes the curve rendering device in detail.

1-2. Structure

Figure 2:
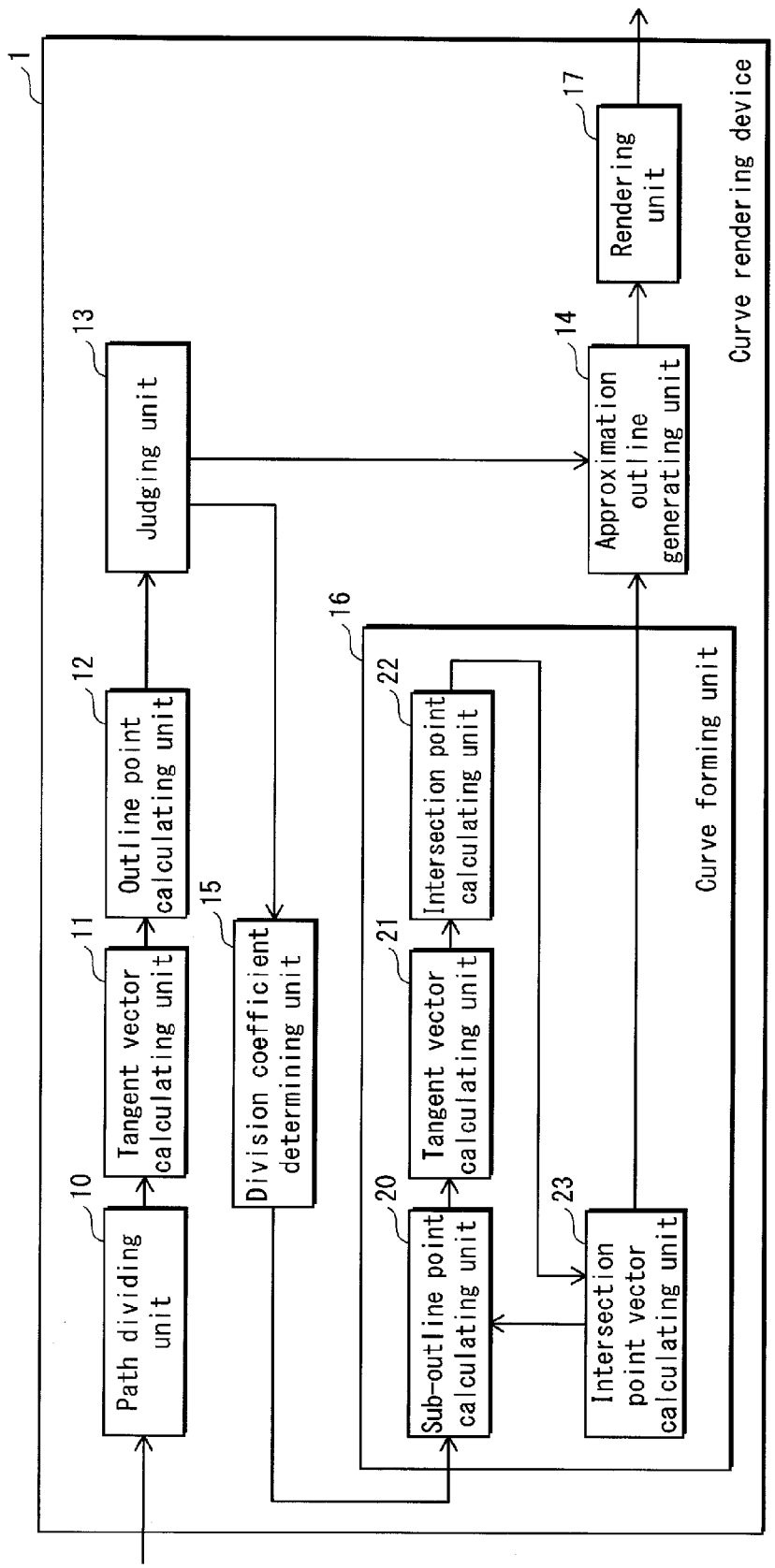
FIG. 2 is a block diagram of a curve rendering device according to the embodiment of the present invention.

FIG. 2 is a block diagram showing the structure of a curve rendering device 1 according to the embodiment of the present invention. The curve rendering device 1 includes a path dividing unit 10, a tangent vector calculating unit 11, an outline point calculating unit 12, a judging unit 13, an approximation outline generating unit 14, and a division coefficient determining unit 15, a curve forming unit 16, and a rendering unit 17.

The path dividing unit 10 receives as input (i) path information indicating a path which is the widthwise center line of a curve to be rendered and (ii) line width information indicating the line width of the curve. In one example, the path information is expressed by a series of coordinates describing end points and control points of cubic Bézier curves. On receiving path information, the path dividing unit 10 divides the path into segments of a predetermined length, thereby generating path segments. At the time of the dividing, the path dividing unit 10 stores the segmentation points that divide the path into segments of the predetermined length. In this embodiment, the curve rendering device 1 describes the segmentation points, points on straight or curved lines, and other points all in terms of coordinates (x and y coordinates). Alternatively, however, the points may be described using other formats. In addition, for the sake of convenience in the following description, "to calculate the coordinates of a point on coordinate axes" is expressed as "to calculate a point".

The tangent vector calculating unit 11 calculates the tangent (expressed as the tangent vector) and the normal (expressed as the normal vector) to the path at each segmentation point calculated by the path dividing unit 10.

The outline point calculating unit 12 calculates outline points corresponding to each segmentation point. Note that an outline point corresponding to a given segmentation point is separated from the segmentation point by half the line width along the normal vector to the path at the segmentation point. That is, there are two outline points corresponding to one segmentation point.

Figure 3:
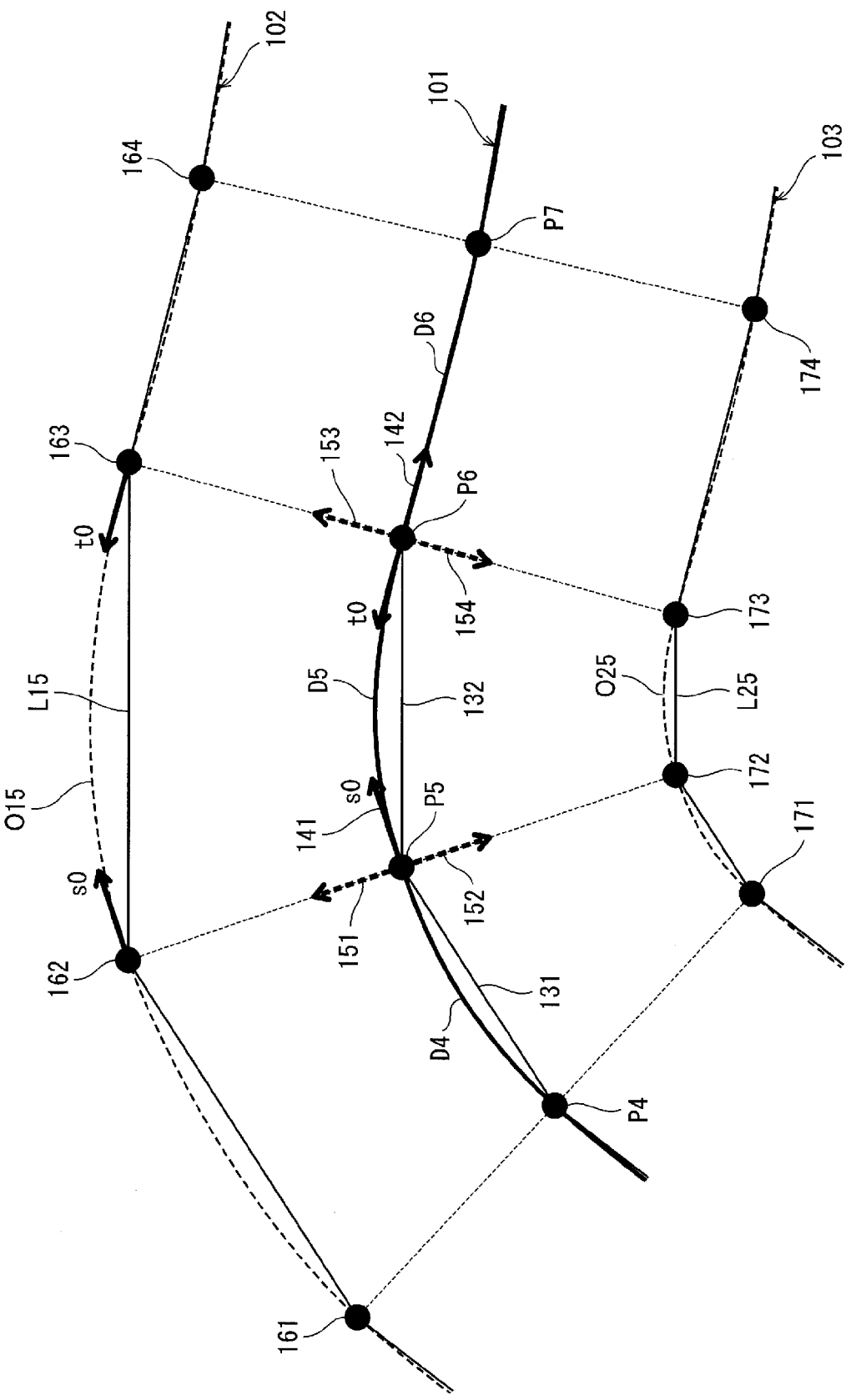
FIG. 3 is a view showing an enlarged detail of a portion of the curve shown in FIG. 1.

Here, with reference to FIG. 3, a specific description is given of the curve to be rendered, path, segmentation points, tangent vectors, normal vectors, and the like. FIG. 3 is a view schematically showing a portion of the curve to be rendered (hereinafter, a curve piece) and is an enlargement of part of FIG. 1. FIG. 3 uses the same reference signs for denoting the same elements as those shown in FIG. 1.

The outline 102 and 103 are portions of the outline of the curve piece. The path 101 is the path of the curve piece.

The segmentation points P4-P7 are points at which the path 101 is segmented. The path segment D4 is a segment of the path 101 delimited at the segmentation points P4 and P5. The path segment D5 is a segment of the path 101 delimited at the segmentation points P5 and P6, whereas the path segment D6 is a segment of the path 101 delimited at the segmentation points P6 and P7. The segments 131 and 132 are line segments connecting the adjacent segmentation points, namely P4 with P5, P5 with P6, and P6 with P7. Hereinafter, a line segment connecting two segmentation points may be referred to as a "segment".

The tangent vector 141 is the vector of the tangent to the path 101 at the segmentation point P5. The tangent vector 142 is the vector of the tangent to the path 101 at the segmentation point P6. In this example, the tangent vector at each segmentation point is defined to match the direction from the start point to the end point of the path. With respect to the path 101, the start point and the end point are determined to be the segmentation points P4 and P7, respectively. In addition, the tangent vector at each segmentation point is a unit vector whose magnitude is one.

The normal vectors 151 and 152 are each the vector of the normal to the path 101 at the segmentation point P5. Similarly, the normal vectors 153 and 154 are each the vector of the normal to the path 101 at the segmentation point P6. In addition, the normal vector at each segmentation point is a unit vector whose magnitude is one.

The outline points 162 and 172 are separated from the segmentation point P5 by half the line width along the normal in the two different directions of the normal vectors 151 and 152. As above, "the outline points separated from a given segmentation point by half the line width along the normal" are hereinafter referred to as the "points corresponding to a given segmentation point". Similarly to the case of the segmentation point P5, the outline points 161 and 171 correspond to the segmentation point P4, the outline points 163 and 173 correspond to the segmentation point P6, and the outline points 164 and 174 corresponding to the segmentation point P7. Naturally, each outline point is a point on one of the portions of outline 102 and 103. Here, a description is given with reference again to FIG. 2.

With respect to the outline points calculated by the outline point calculating unit 12, the judging unit 13 judges which of the first and second approximation scheme is to be used for approximating a line segment connecting each adjacent outline points. The judgment is made separately for each path segment. More specifically, the judging unit 13 first selects two segmentation points located at the ends of a path segment (in one example, the segmentation points P5 and P6 shown in FIG. 3 are selected). Next, the judging unit 13 divides the four outline points corresponding to the two segmentation points thus selected (in this example, the outline points 162, 172, 163, and 173) into two pairs of outline points located on the same side with respect to the straight line connecting the two segmentation points (in this example, the outline point 162 is paired with the outline point 163, whereas the outline point 172 is paired with the outline point 173). The judging unit 13 then calculates the distance between the outline points in each pair (i.e., the lengths L15 and L25). Of the two distances calculated, the line segment connecting the outline points that are separated by the longer distance is designated as the longer line segment mentioned above, and the line segment connecting the outline points that are separated by the shorter distance is designated as the shorter line segment also mentioned above (in this example, L15 is the longer line segment, and L25 is the shorter line segment). The judging unit 13 then judges whether or not the ratio between the thus calculated two distances, i.e., the ratio of the longer line segment to the shorter line segment, is greater than the predetermined value. In one example, the predetermined value is 2. Since the ratio calculated here is the ratio of the longer line segment to the shorter line segment, the ratio always takes a value equal to 1 or greater. On judging that the calculated ratio is greater than the predetermined value, the judging unit 13 judges that further linear approximation is necessary and thus selects the second approximation scheme. On the other hand, on judging that the calculated ratio is equal to the predetermined value or smaller, the judging unit 13 then judges that no further linear approximation is necessary and thus selects the first approximation scheme. According to the present embodiment, the first approximation scheme is to connect the two adjacent outline points by a single line segment. As described above, while a longer partial outline is approximated using a selected one of the first and second approximation scheme, a shorter partial outline is always approximated using the first approximation scheme.

When the judging unit 13 judges that the ratio of the longer line segment to the shorter line segment is equal to the predetermined value or smaller, the approximation outline generating unit 14 approximates the longer partial outline by the first approximation scheme. For example, when approximating a curve connecting the outline points 162 and 163 shown in FIG. 3 by the first approximation scheme, the approximation outline generating unit 14 uses the straight line connecting the outline points 162 and 163 as an approximation outline segment L15.

On the other hand, when the judging unit 13 judges that the ratio of the longer line segment to the shorter line segment is greater than the predetermined value, the curve forming unit 16 performs the approximation calculation for the longer partial outline. The approximation outline generating unit 14 uses the computation result obtained by the curve forming unit 16 to approximate the longer partial outline with a plurality of line segments.

When the judging unit 13 judges that the ratio of the longer line segment to the shorter line segment is greater than the predetermined value, the division coefficient determining unit 15 determines the division coefficient which is used to derive the number of line segments used to approximate the longer partial outline. More specifically, the number of line segments used to approximate the longer partial outline is given by $2(d+1)$.

In one example, the division coefficient d is calculated by the following equation.

$$d=\text{floor}(g\times\text{length of longer line segment/length of shorter line segment}-f) \quad \text{[Equation 1]}$$

In the equation, floor(x) denotes the maximum integral equal to or smaller than a real number x. In one example, in addition, g=0.809 and f=−0.5.

Figure 4:
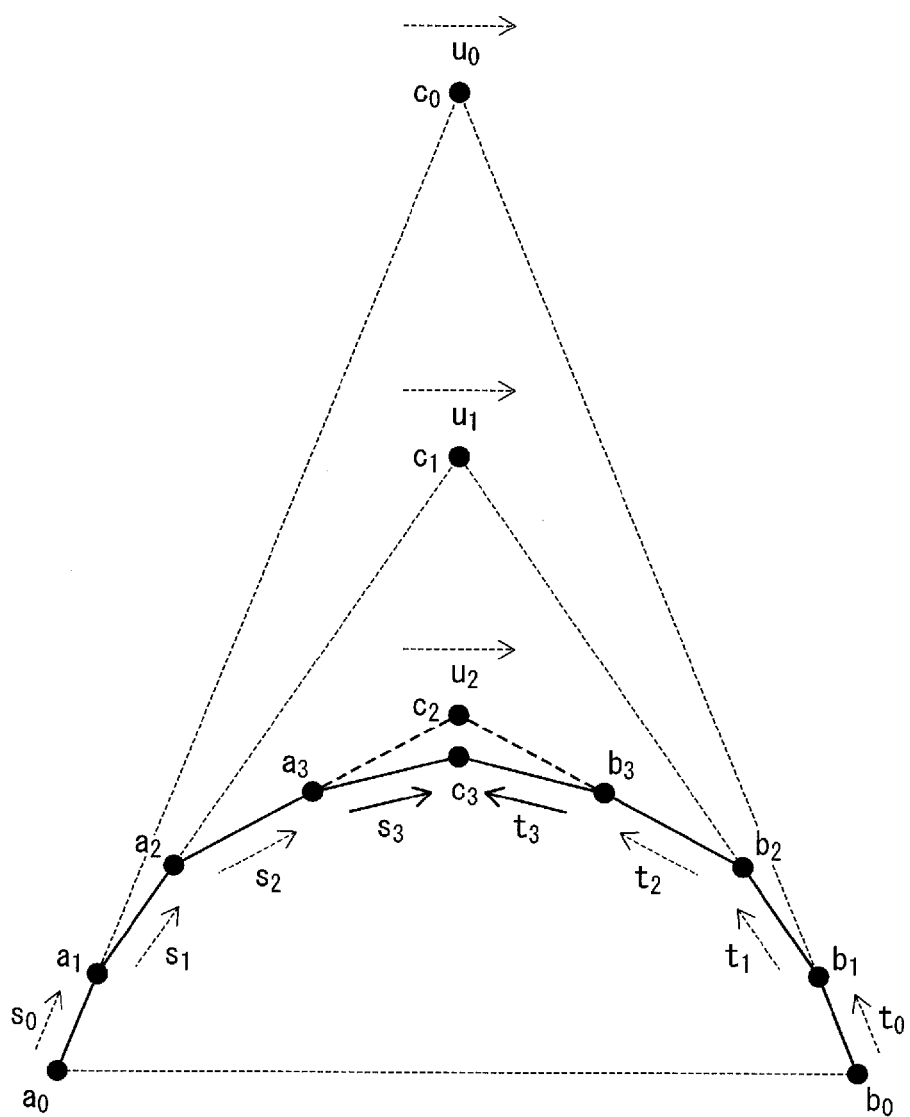
FIG. 4 is an approximation curve formed by a curve forming unit according to the embodiment of the present invention.

When the judging unit 13 judges that the ratio of the longer line segment to the shorter line segment is greater than the predetermined value, the curve forming unit 16 approximates the longer partial outline by the second approximation scheme. As shown in FIG. 2, the curve forming unit 16 includes a sub-outline point calculating unit 20, a tangent vector calculating unit 21, an intersection point calculating unit 22, and an intersection point calculating unit 23. For purposes of convenience, the component units of the curve forming unit 16 are described by explaining the second approximation scheme with supplemental reference to FIG. 4. FIG. 4 is a view showing an approximation curve generated by the curve forming unit. The points $a_0$ and $b_0$ in FIG. 4 are the end points of a longer partial outline subjected to the approximation process. Suppose, for example, that the points $a_0$ and $b_0$ correspond to the outline points 162 and 163 shown in FIG. 3, and that the line segment connecting the points $a_0$ and $b_0$ is the longer line segment L15 subjected to the approximation process.

The curve forming unit 16 performs the approximation process according to the second approximation scheme, which involves the computations (A) through (D) (the computations (A) through (D) are collectively referred to as "basic approximation calculation") with respect to each value of n ranging from 0 to d to obtain $a_n$, $b_n$, and $c_n$. Ultimately, the approximation curve passing through the points $a_0, a_1, \ldots a_d, c_d, b_d, \ldots b_1$ and $b_0$ is obtained.

(A) Calculation of Sub-Outline Points $a_n$ and $b_n$

The outline point calculating unit 20 calculates the sub-outline points $a_n$ and $b_n$ using Equations 2 and 3 below. The outline points $a_n$ and $b_n$ are the end points of one of a plurality of line segments used to approximate a curve connecting the outline points $a_0$ and $b_0$.

$$a_n = a_{n-1} + 2^{n-1-d}(c_{n-1} - a_{n-1}) \quad \text{[Equation 2]}$$

$$b_n = b_{n-1} + 2^{n-1-d}(c_{n-1} - b_{n-1}) \quad \text{[Equation 3]}$$

Note, however, in the case where n=0, the outline points $a_0$ and $b_0$ are given as the respective initial values of $a_n$ and $b_n$ and thus Equations 1 and 2 are not computed. The description of the intersection point $c_n$ (or $c_{n-1}$) will be given later.

(B) Calculation of Tangent Vectors $s_n$ and $t_n$

The tangent vector calculating unit 21 calculates the tangent vector $s_n$ at the sub-outline point $a_n$ and the tangent vector $t_n$ at the sub-outline point $b_n$ using Equations 4 and 5 below. The tangent vectors $s_n$ and $t_n$ are used to calculate the intersection point $c_n$, which will be described later.

$$s_n = 2^{-d}\{(2^{d-(n-1)}-1)u_{n-1} + s_{n-1}\} \quad \text{[Equation 4]}$$

$$t_n = 2^{-d}\{(2^{d-(n-1)}-1)(-u_{n-1}) + t_{n-1}\} \quad \text{[Equation 5]}$$

Note that the vector $(-u_{n-1})$ appearing in Equation 5 is a reveres of an intersection point vector $u_{n-1}$, which will be described later.

Note that when n=0, the tangent vector at a segmentation point corresponding to $a_0$ is used as the tangent vector $s_0$ at the point $a_0$. Also, as the tangent vector $t_0$ at $b_0$, the inverse of the tangent vector at a segmentation point corresponding to $b_0$ is used. That is, when n=0, Equations 4 and 5 are not computed.

Note that although termed as the "tangent vectors", the vectors $s_n$ and $t_n$ are not of the tangents to the sub-outline points $a_n$ and $b_n$. Nevertheless, the vectors $s_n$ and $t_n$ are termed as "tangent vector" as they are derived from a recurrence formula using the tangent vectors $s_0$ and $t_0$ as the initial values.

(C) Calculation of Intersection Point $c_n$

The intersection point calculating unit 22 calculates the intersection point $c_n$ of two straight lines, one extending from the point $a_n$ in the direction of tangent vector $s_n$, and the other from the point $b_n$ in the direction of the tangent vector $t_n$.

(D) Calculation of Intersection Point Vector $u_n$

The intersection point calculating unit 23 calculates the vector $u_n$ at the intersection point $c_n$ using Equation 6 below (hereinafter, the vector is referred to as the "intersection point vector").

$$u_n = s_n + (-t_n) \quad \text{[Equation 6]}$$

In Equation 6, the vector $(-t_n)$ is a reverse of the tangent vector $t_n$.

The rendering unit 17 fills the region between the two approximation curves, one for the outline 102 and the other for the outline 103, generated by the approximation outline generating unit 14 and presents the resulting image on a display or the like.

1-3. Operation

The following describes the approximation process performed by the curve rendering device 1 having the configuration described above.

Figure 5:
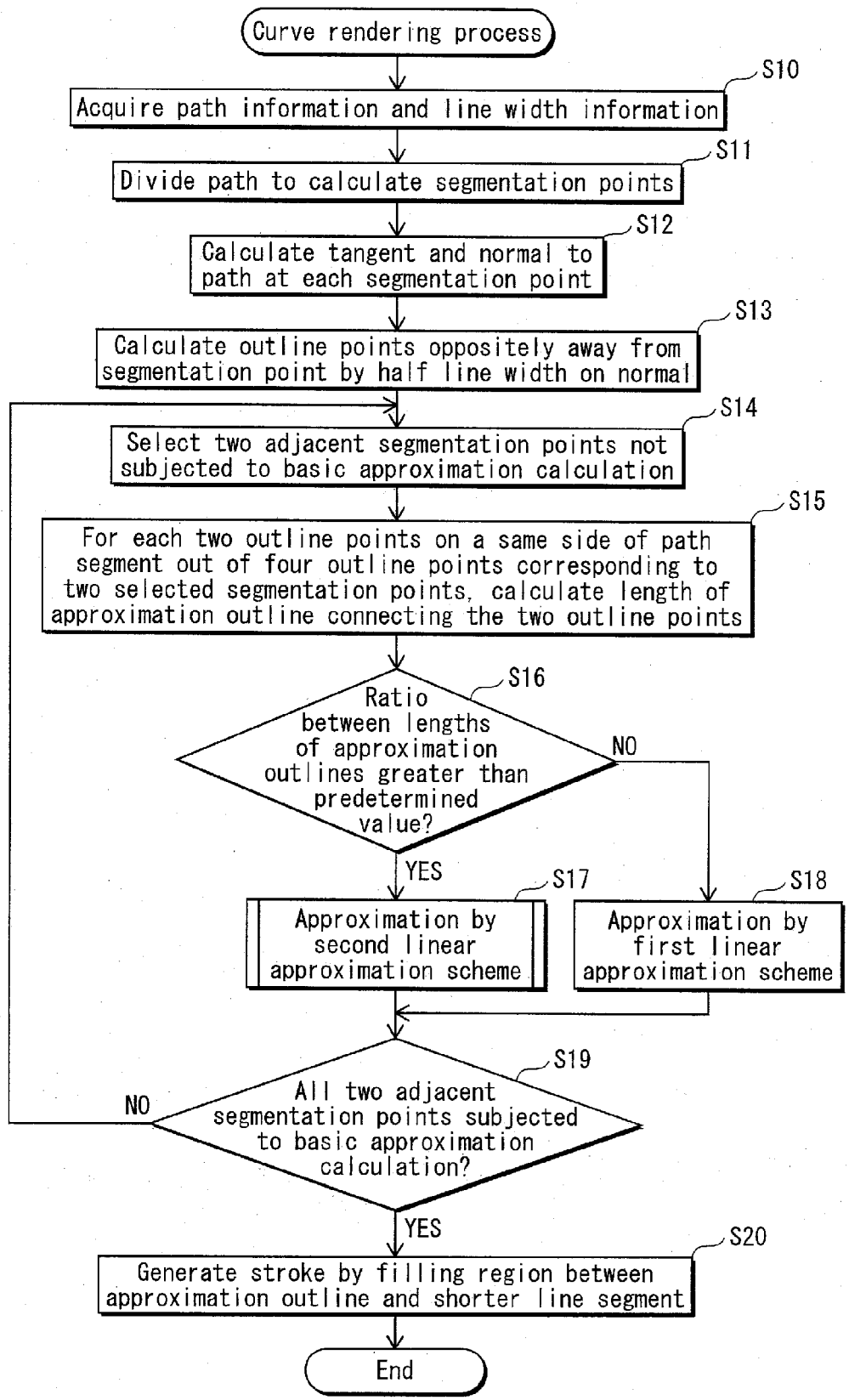
FIG. 5 is a flowchart showing an approximation process according to the embodiment of the present invention.

FIG. 5 is a flowchart of the approximation process.

First of all, the path dividing unit 10 receives, as input, path information and line width information (S10). The path dividing unit 10 calculates segmentation points for dividing the path indicated by the received path information into segments of the predetermined length (S11). Next, the tangent vector calculating unit 11 calculates the tangent vectors and normal vectors to the path at each segmentation point calculated by the path dividing unit 10 (S12). Then, for each segmentation point calculated by the path dividing unit 10, the outline point calculating unit 12 calculates two outline points each of which is separated from the segmentation point by half the line width (S13). Then, the judging unit 13 selects two segmentation points that are adjacent to each other from all the segmentation points calculated by the path dividing unit 10 (S14). Of the four outline points corresponding to the thus selected two segmentation points, the judging unit 13 pairs up each two outline points located on the same side with respect to the path segment delimited by the two segmentation points and calculates the distance between the two outline points in each pair (S15). Note that the distance between outline points in a pair is equal to the approximation outline segment connecting the outline points. The judging unit 13 then calculates the ratio between the two distances between the respective pairs of the outline points and judges whether the thus calculated ratio is greater than the predetermined value (S16). If the thus calculated ratio is greater than the predetermined value (S16: YES), the longer partial outline is approximated by the second approximation scheme (S17). On the other hand, if the thus calculated ratio is equal to the predetermined value or smaller (S16: NO), the longer partial outline is approximated by the first approximation scheme (S18). The details of step S17 will be described later with reference to FIG. 6. Then, the judging unit 13 judges whether all pairs of adjacent segmentation points have been subjected to the basic approximation calculation (S19). If there is any pair remain unprocessed (S19: NO), the processing moves onto S14. On the other hand, all the pairs of adjacent segmentation points have been subjected to the basis approximation calculation (S19: YES), the rendering unit 17 generates and renders the approximation curve by filling the region between the approximation outline segments (S20).

Figure 6:
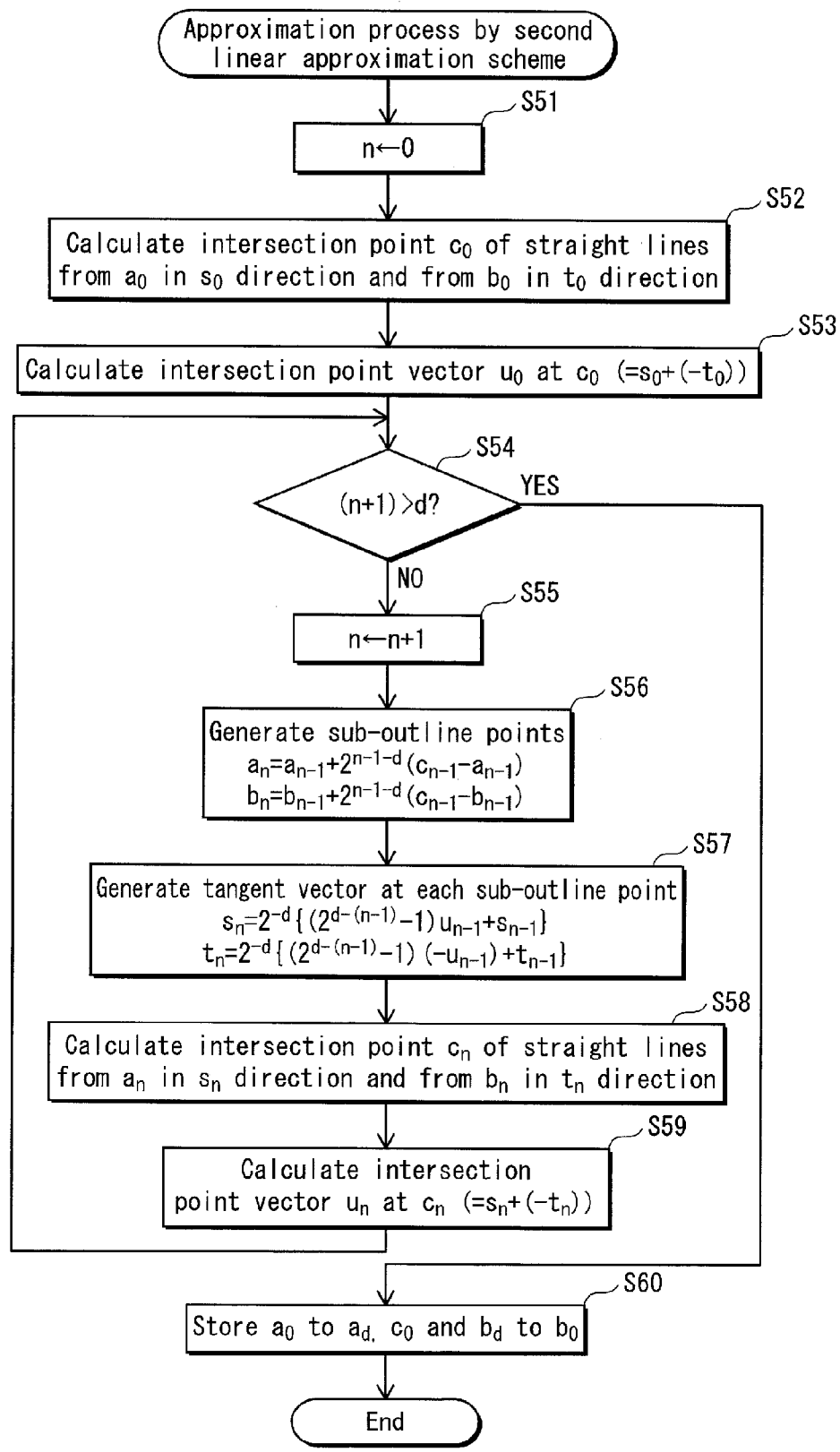
FIG. 6 is a flowchart showing an approximation process by a second approximation scheme according to the embodiment of the present invention.

FIG. 6 is a flowchart of the approximation process according to the second approximation scheme, which is carried out in step S17 shown in FIG. 5.

First, the controller of the curve forming unit 16 initializes the variable n to zero (S51). Next, the intersection point calculating unit 22 calculates the intersection point $c_0$ using the outline points $a_0$ and $b_0$ as well as the tangent vectors $s_0$ and $t_0$ at the outline point $a_0$ and $b_0$ (S52). Note that the outline points $a_0$ and $b_0$ are calculated by the outline point calculating unit 12, whereas the tangent vectors $s_0$ and $t_0$ are calculated by the tangent vector calculating unit 11. Then, the intersection point calculating unit 23 calculates the intersection point vector $u_0$ (S53).

The controller of the curve forming unit 16 judges whether or not the value of (n+1) is greater than d (S54). If (n+1) is not greater than d (S54: NO), the controller of the curve forming unit 16 increments n by 1 (S55). The sub-outline point calculating unit 20 calculates the sub-outline points $a_n$ and $b_n$ using Equations 2 and 3 (S56). Then, the tangent vector calculating unit 21 calculates the tangent vectors $s_n$ and $t_n$ at the sub-outline points $a_n$ and $b_n$ using Equations 4 and 5 (S57). The intersection point calculating unit 22 calculates the intersection point $c_n$ of two straight lines, one extending from the point $a_n$ in the direction of tangent vector $s_n$, and the other from the point $b_n$ in the direction of the tangent vector $t_n$ (S58). Then, the intersection point calculating unit 23 calculates the intersection point $u_n$ at the intersection point $c_n$, using Equation 6 (S59).

If the judgment made in step S54 described above results in that (n+1) is greater than d (S54: YES), it means that the sub-outline points $a_n$ and $b_n$, tangent vectors $s_n$ and $t_n$, intersection point $c_n$, and intersection point vector $u_n$ have already calculated for each value of n ranging from 0 to d. Thus, the ultimate approximation curve connecting the points $a_0$-$a_1$-$a_2$-$a_3$-$c_3$-$b_3$-$b_2$-$b_1$-$b_0$ is obtained. The outline points and sub-outline points $a_0$, $a_1$, $a_2$, $a_3$, $c_3$, $b_3$, $b_2$, $b_1$, and $b_0$ defining the approximation curve $a_0$-$a_1$-$a_2$-$a_3$-$c_3$-$b_3$-$b_2$-$b_1$-$b_0$ are stored (S60).

As a supplemental explanation of FIG. 6, the points and vectors calculated through the approximation process for each n incremented from 0 to d are described with reference to FIGS. 7-9 and FIG. 4 to provide an intuitive comprehension (for purposes of description, d is defined to be 3).

Figure 7:
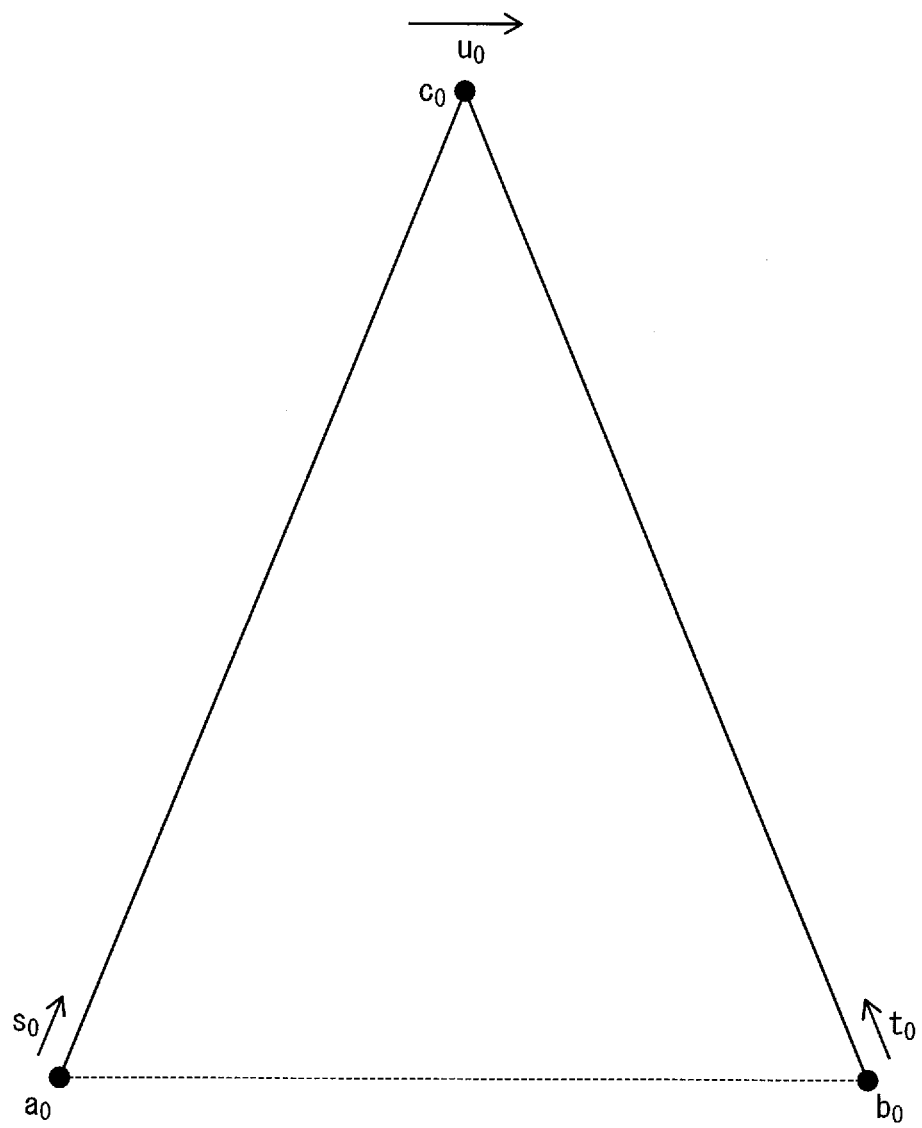
FIG. 7 is a view for illustrating an approximation curve obtained as a result of a basic approximation calculation (where n=0) according to the embodiment of the present invention.

FIG. 7 illustrates an approximation curve obtained as a result of the basic approximation calculation, where n=0. The outline points $a_0$ and $b_0$ as well as the tangent vectors $s_0$ and $t_0$ are already known prior to execution of the approximation process. In step S52, the intersection point calculating unit 22 calculates the intersection point $c_0$. In step S53 that follows, the intersection point calculating unit 23 calculates the intersection point vector $u_0$. In step S54, the controller judges that n+1 (=1) is not greater than d (S54: NO). Thus, in step S55, the controller increments n by 1. Then, the processing moves onto step S56.

Figure 8:
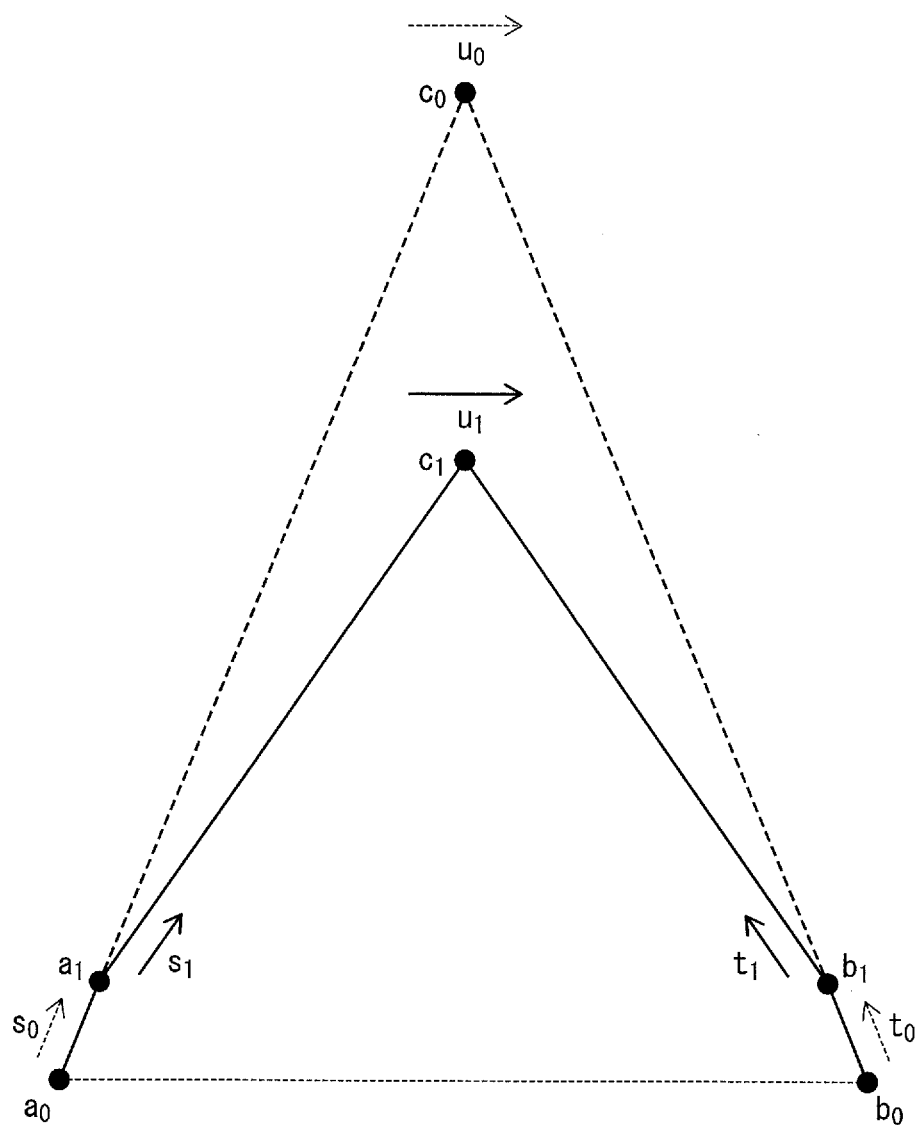
FIG. 8 is a view for illustrating an approximation curve obtained as a result of a basic approximation calculation (where n=1) according to the embodiment of the present invention.

FIG. 8 illustrates an approximation curve obtained as a result of the basic approximation computation, where n=1. When n=1 in step S56 shown in FIG. 6, the sub-outline point calculating unit 20 calculates the sub-outline points $a_1$ and $b_1$. Next, in step S57, the tangent vector calculating unit 21 calculates the tangent vectors $s_1$ and $t_1$. Then, in step S58, the intersection point calculating unit 22 calculates the intersection point $c_1$. Then, in step S59, the intersection point calculating unit 23 calculates the intersection point vector $u_1$. In step S54, the controller judges that n+1 (=2) is not greater than d (S54: NO). Thus, in step S55, the controller increments n by 1. Then, the processing moves onto step S56.

Figure 9:
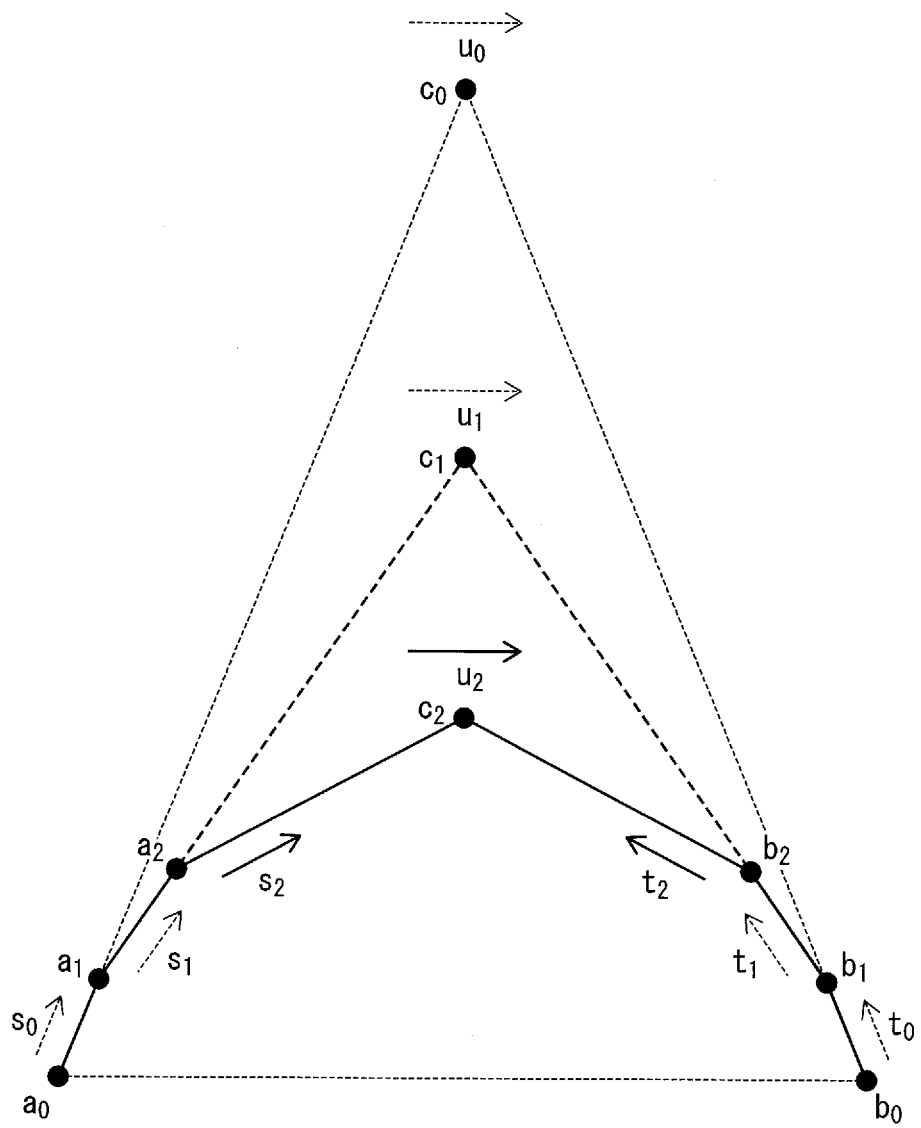
FIG. 9 is a view for illustrating an approximation curve obtained as a result of a basic approximation calculation (where n=2) according to the embodiment of the present invention.

FIG. 9 illustrates an approximation curve obtained as a result of the basic approximation computation, where n=2. When n=2 in step S56 shown in FIG. 6, the sub-outline point calculating unit 20 calculates the sub-outline points $a_2$ and $b_2$. Next, in step S57, the tangent vector calculating unit 21 calculates the tangent vectors $s_2$ and $t_2$. Then, in step S58, the intersection point calculating unit 22 calculates the intersection point $c_2$. Then, in step S59, the intersection point calculating unit 23 calculates the intersection point vector $u_2$. In step S54, the controller judges that n+1 (=3) is not greater than d (S54: NO). Thus, in step S55, the controller increments n by 1. Then, the processing moves onto step S56.

FIG. 4 illustrates an approximation curve obtained as a result of the basic approximation computation, where n=3, and a relevant description has been given briefly. When n=3 in step S56 shown in FIG. 6, the sub-outline point calculating unit 20 calculates the sub-outline points $a_3$ and $b_3$. Next, in step S57, the tangent vector calculating unit 21 calculates the tangent vectors $s_3$ and $t_3$. Then, in step S58, the intersection point calculating unit 22 calculates the intersection point $c_3$. Then, in step S59, the intersection point calculating unit 23 calculates the intersection point vector $u_3$. In step S54, the controller judges that n+1 (=4) is greater than d (S54: YES). Thus, the processing moves onto step S60.

Through the above-described processing steps, the ultimate approximation curve $a_0$-$a_1$-$a_2$-$a_3$-$c_3$-$b_3$-$b_2$-$b_1$-$b_0$ is calculated. The respective points $a_0$, $a_1$, $a_2$, $a_3$, $c_3$, $b_3$, $b_2$, $b_1$, and $b_0$ defining the approximation curve are stored.

2. Modifications and Additional Note

Up to this point, the embodiment of the curve rendering device according to the present invention has been described. It is naturally appreciated, however, that the specific curve rendering device described above may be modified as follows and that the present invention is not limited to the specific curve rendering device described in the above embodiment.

(1) According to the above embodiment, the path dividing unit 10 divides the path into a predetermined length. However, it is not the only example that the path is divided into the predetermined length. It is sufficient that the path is divided into any other length suitable for the approximation process. For example, the length(s) into which the path is to be divided may be determined in view of the balance between the computational load required for the approximation process and the approximation accuracy of the curve rendered as a result of the approximation process. More specifically, for example, the path may be divided into varying lengths, so that the path segments located near an inflection point are shorter than the other path segments or that a more linear portion of the path is divided into longer segments. In another example, a straight portion of the path may not be divided at all.

(2) According to the above embodiment, the judging unit 13 judges whether or not to approximate a longer partial outline using a greater number of line segments, based on whether or not the ratio of the longer line segment to the shorter line segment is greater than the predetermined value. However, the judgment may be duly made as long as it is judged whether or not the difference between the longer line segment and the shorter line segment is greater than a predetermined level. The following describe one alternative example. First, with respect to two adjacent segmentation points, four offset points separated from the corresponding segmentation point by a predetermined distance along the normal to the path are determined. Here, the predetermined distance is not equal to half the line width used in the above embodiment. Then, each offset point is paired with another offset point located on the same side with respect to the path segment (or segment), and the distance between each pair of offset points is calculated to obtain the ratio between the thus calculated distances. The judgment is made based on whether the thus obtained ratio is greater than the predetermined value. In another alternative, instead of the ratio of the longer line segment to the shorter line segment, another comparable ratio may be used. For example, the ratio of the length of either of the longer or shorter line segment to the length of the path segment may be used.

(3) According to the above embodiment, the judging unit 13 judges whether or not the ratio of the longer line segment to the shorter line segment is greater than the predetermined value. However, in some cases, it may be apparent that no further approximation process is necessary without having to calculate the ratio. If it is detected this is the case, the calculation of the ratio of the longer line segment to the shorter line segment may be omitted. For example, prior to the judgment as to whether the ratio of the longer line segment to the shorter line segment is greater than the predetermined value, a judgment may be made to see if the longer line segment is shorter than a predetermined length. If the longer line segment is shorter than the predetermined length, further approximation would make no visually noticeable difference. Therefore, the judgment is made that no further approximation is necessary.

(4) According to the above embodiment, the division coefficient d is determined by using Equation 1. Alternatively, however, the division coefficient d may be a fixed value or determined by using another equation based on the computing power of the device, the display capability of the display device used for displaying approximation curves, and the accuracy of the curve to be rendered as a result of the approximation for the following reason. That is, although a greater division coefficient d is assumed to result in an approximation curve that more accurately follows the curve to be rendered, more computing power is required.

(5) According to the present embodiment, the judging unit 13 compares the ratio of the longer line segment to the shorter line segment to the predetermined value that is two. However, this value is merely an example. A suitable value may be determined by running a simulation or the like in view of the required accuracy of an approximation curve, the display capability of the display device used for displaying approximation curves, and the computing power of the curve rendering device.

(6) According to the present embodiment, the judging unit 13 makes no judgment as to whether or not an intersecting point of the two normals passing thorough two adjacent segmentation points is located, on either of the normals, between the segmentation point and the outline point. Such a rather exceptional case where the normals intersect may be processed differently from the case where the normals do not intersect. In one specific example, of the two partial outlines passing through two segmentation points, the partial outline located on the opposite side from the intersection point of the normals with respect to the path segment (that means, the longer one of the partial outlines) is approximated with a plurality of curves, and the other one of the two partial outlines (that means, the shorter one of the partial outlines) is not approximated. In one option relating to the calculation of four outline points each of which is separated from a corresponding one of the two segmentation points by a predetermined distance, this predetermined distance may be less than ½ of the path segment. This option ensures to avoid that the normals intersect with each other in the manner described above.

(7) According to the present embodiment, the approximation process according to the second approximation scheme involves the use of Equations 1-6. However, these are merely examples of approximation algorithms and another algorithm may be used to approximate the longer partial outline. According to the present embodiment, in addition, Equations 2-5 involve arithmetic operations of base-2 numbers such as $2^d$. This arrangement is to allow for simplification of arithmetic operations required for the internal processing of the computer. By modifying the base number to be less than 2, the resulting approximation curve will be of a smoother curve. Therefore, it is applicable to use the base number less than 2. It goes without saying that the base number greater than 2 is usable as well.

(8) According to the present embodiment, the path information indicates the path using a series of coordinates describing control points of a cubic Bézier curve. However, this is merely one example and any other indication may be usable as long as a curve is duly indicated.

(9) In order to cause execution of the approximation process and other processes described in the above embodiment by the processor of a curve rendering device or various circuits connected to the processor, a control program composed of appropriate program code written in a machine language or high-level language may be recorded onto a recoding medium or distributed via various communication channels. Examples of such a recording medium include an IC card, hard disk, optical disc, flexible disc, ROM, and flash memory. The control program thus distributed may be used by being stored in memory or the like that is readable by a processor. When the processor executes the control program, the functions described in the embodiments are realized. Note that the processor may execute the control program directly or by compiling or interpreting the program code.

(10) The functional components (including the path dividing unit 10, tangent vector calculating unit 11, outline point calculating unit 12, judging unit 13 approximation outline generating unit 14, division coefficient determining unit 15, curve forming unit 16, and rendering unit 17) described in the above embodiment may be realized by circuits executing their functions or by one or more processors executing a suitable program. Typically, each functional component described above may be realized by an LSI, which is a type of an integrated circuit. Each LSI may be separately implemented on a single chip, or some or all LSIs may be implemented on a single chip. Although an LSI is specifically mentioned, the integrated circuit may be termed as an IC, system LSI, super LSI, or ultra LSI, depending on the packaging density. In addition, the scheme employed to realize an integrated circuit is not limited to LSI and such an integrated circuit may be realized by a dedicated circuit or by a general-purpose processor. For example, it is applicable to use an FPGA (Field Programmable Gate Array) that enables post-manufacturing programming of an LSI circuit or a reconfigurable processor that enables reconfiguration of connection between circuit cells within an LSI circuit and their settings. When any new circuit integration technology becomes available or derived as the semiconductor technology advances, such new technology may be employed to integrate the functional blocks. One possibility lies in adapting biotechnology.

(11) Any of the embodiments and modifications may be combined part by part.

3. Supplemental Note

The following further describes the structure and advantages of the curve rendering device according to the embodiments and modifications.

(1) A curve rendering device according to one embodiment of the present invention renders a curve, which has a width and defined by a center line and a line width, by linear approximation of an outline of the curve. The curve rendering device includes: a segmentation point calculating unit configured to calculate a plurality of segmentation points on the center line for segmenting the center line; an offset point calculating unit configured to calculate, for each of the segmentation points, two offset points separated from the segmentation point by an equal distance on a normal to the center line at the segmentation point; a distance calculating unit configured to calculate a distance between offset points in each of two pairs selected from four offset points calculated for two adjacent segmentation points, the offset points in each pair being located on a same side with respect to a straight line connecting the two adjacent segmentation points; a judging unit configured to calculate a ratio between the calculated two distances using the shorter one of the distances as a denominator, and judge whether or not the ratio is greater than a predetermined value; and a curve forming unit configured to approximate, between two partial outlines which are portions of the outline delimited at the respective normals at the two adjacent segmentation points, the longer one of the two partial outlines by using a greater number of line segments than line segments used to approximate the shorter one of the two partial outlines when the ratio is judged to be greater than the predetermined value.

With the above configuration, a judgment as to whether or not to use a greater number of line segments to approximate the longer one of the two partial outlines than the line sermons used to approximate the shorter one of the two partial outlines is made by comparing the distances between the two pairs of offset points. This processing is simple and computationally less expensive as compared with conventional processes.

(2) Optionally, the offset point calculating unit may calculate, as the two offset points separated from the segmentation point by the equal distance, points that are separated from the segmentation point by half the line width.

With the above configuration, each offset point coincides with a point on the outline, i.e., an end point of a partial outline. This arraignment eliminates the need to separately calculate endpoints of the partial outlines.

(3) Optionally, the curve forming may unit approximate the shorter partial outline with a single line segment. The segmentation point calculating unit may segment the center line so that the single line segment approximating the shorter partial outline becomes equal to a predetermined length or shorter.

With the above configuration, the shorter partial outline in each set of two partial outlines is approximated with a single line segment. This relatively simple approximation process is advantageous to reduce the overall processing load required for approximation.

(4) Optionally, the curve forming unit may determine the number of line segments used to approximate the longer partial outline in relation to the ratio calculated by the judging unit.

The above configuration ensures that the partial outline is approximated using an appropriate number of line segments suitably determined according to the ratio.

(5) Optionally, when approximating the longer partial outline, the curve forming unit may calculate points $a_n$ and $b_n$ and vectors $s_n$, $t_n$, and $u_n$, with respect to each integer from 1 to d, using following equations:

$$a_n = a_{n-1} + 2^{n-1-d}(c_{n-1} - a_{n-1});$$

$$b_n = b_{n-1} + 2^{n-1-d}(c_{n-1} - b_{n-1});$$

$$s_n = 2^{-d}\{(2^{d-(n-1)}-1)u_{n-1} + s_{n-1})\};$$

$$t_n = 2^{-d}\{(2^{d-(n-1)}-1)(-u_{n-1}) + t_{n-1})\}; \text{ and}$$

$$u_n = s_n + (-t_n).$$

Here, $a_0$ and $b_0$ denote end points of the longer partial outline, $s_0$ denotes a tangent vector to the center line at the point $a_0$, $t_0$ denotes an inverse of a tangent vector to the center line at the point $b_0$, $c_0$ denotes an intersection point of a straight line extending from the point $a_0$ in a direction of the vector $s_0$ and a straight line extending from the point $b_0$ in a direction of the vector $t_0$, and d denotes a division coefficient. In the equations, a point $c_n$ denotes an intersection point of a straight line extending from the point $a_n$ in a direction of the vector $s_n$ and a straight line extending from the point $b_n$ in a direction of the vector $t_n$. The curve forming unit may approximate the longer partial outline with a sequence of straight lines defined by connecting (d+1) points $a_m$ (m is an integer from 0 to d), a point $c_d$, and (d+1) points $b_m$.

With the above configuration, to approximate a partial outline, a suitable approximation curve composed of a plurality of line segments is computed using a simple recurrence formula.

(6) Optionally, when one of the two normals intersects with the other at a point between the offset points on the normal, the curve forming unit may approximate one of the partial outlines with a plurality of curves irrespective of the judgment by the judging unit. The one of the partial outlines is located on an opposite side from the intersecting point of the normals with respect to a straight line connecting the two adjacent segmentation points.

With the above configuration, even in a rather exceptional case where the two normals intersect, it is still reliably judged to approximate one of the two partial outlines with a plurality of curves.

(7) In another aspect, a curve rendering method according to one embodiment of the present invention is used in a curve rendering device for rendering a curve, which has a width and defined by a center line and a line width, by linear approximation of an outline of the curve. The curve rendering device includes a segmentation point calculating unit, an offset point calculating unit, a distance calculating unit, a judging unit, and a curve forming unit. The curve rendering method includes the steps of: a segmentation point calculating step performed by the segmentation point calculating unit to calculate a plurality of segmentation points on the center line for segmenting the center line; an offset point calculating step performed by the offset point calculating unit to calculate, for each of the segmentation points, two offset points separated from the segmentation point by an equal distance on a normal to the center line at the segmentation point; a distance calculating step performed by the distance calculating unit to calculate a distance between offset points in each of two pairs selected from four offset points calculated for two adjacent segmentation points, the offset points in each pair being located on a same side with respect to a straight line connecting the two adjacent segmentation points; a judging step performed by the judging unit to calculate a ratio between the calculated two distances using the shorter one of the distances as a denominator, and judge whether or not the ratio is greater than a predetermined value; and a curve forming step performed by the curve forming unit to approximate, between two partial outlines which are portions of the outline delimited at the respective normals at the two adjacent segmentation points, the longer one of the two partial outlines by using a greater number of line segments than line segments used to approximate the shorter one of the two partial outlines when the ratio is judged to be greater than the predetermined value.

In yet another aspect, a curve rendering program according to one embodiment of the present invention is for causing a computer to function as a curve rendering device that is for rendering a curve, which has a width and defined by a center line and a line width, by linear approximation of an outline of the curve. The curve rendering program includes code for causing the computer to function as: a segmentation point calculating unit configured to calculate a plurality of segmentation points on the center line for segmenting the center line; an offset point calculating unit configured to calculate, for each of the segmentation points, two offset points separated from the segmentation point by an equal distance on a normal to the center line at the segmentation point; a distance calculating unit configured to calculate a distance between offset points in each of two pairs selected from four offset points calculated for two adjacent segmentation points, the offset points in each pair being located on a same side with respect to a straight line connecting the two adjacent segmentation points; a judging unit configured to calculate a ratio between the calculated two distances using the shorter one of the distances as a denominator, and judge whether or not the ratio is greater than a predetermined value; and a curve forming unit configured to approximate, between two partial outlines which are portions of the outline delimited at the respective normals at the two adjacent segmentation points, the longer one of the two partial outlines by using a greater number of line segments than line segments used to approximate the shorter one of the two partial outlines when the ratio is judged to be greater than the predetermined value.

In yet another aspect, an integrated circuit according to one embodiment of the present invention is used in a curve rendering device for rendering a curve, which has a width and defined by a center line and a line width, by linear approximation of an outline of the curve. The integrated circuit includes: a segmentation point calculating unit configured to calculate a plurality of segmentation points on the center line for segmenting the center line; an offset point calculating unit configured to calculate, for each of the segmentation points, two offset points separated from the segmentation point by an equal distance on a normal to the center line at the segmentation point; a distance calculating unit configured to calculate a distance between offset points in each of two pairs selected from four offset points calculated for two adjacent segmentation points, the offset points in each pair being located on a same side with respect to a straight line connecting the two adjacent segmentation points; a judging unit configured to calculate a ratio between the calculated two distances using the shorter one of the distances as a denominator, and judge whether or not the ratio is greater than a predetermined value; and a curve forming unit configured to approximate, between two partial outlines which are portions of the outline delimited at the respective normals at the two adjacent segmentation points, the longer one of the two partial outlines by using a greater number of line segments than line segments used to approximate the shorter one of the two partial outlines when the ratio is judged to be greater than the predetermined value.

With the above configuration, a judgment as to whether or not to approximate a partial outline using a greater number of line segments is made by comparing the distances between the two pairs of offset points. This processing is simple and computationally less expensive as compared with conventional processes.

A curve rendering device according to the present invention calculates outlines of text fonts and geometric figures through a simple and computationally less expensing process as compared with a conventional process. The curve rendering device is suitable for various devices, including information processing terminals, that display such text fonts and geometric figures on a display.

REFERENCE SIGNS LIST

1 Curve rendering device
10 Path dividing unit
11 Tangent vector calculating unit
12 Outline point calculating unit
13 Judging unit
14 Approximation outline generating unit
15 Division coefficient determining unit
16 Curve forming unit
17 Rendering unit
20 Sub-outline point calculating unit
21 Tangent vector calculating unit
22 Intersection point calculating unit
23 Intersection point vector calculating unit
101 Path
102-103 Outline
P4-P7 Segmentation point
D4-D6 Path segment
131-133 Segment
141-142 Tangent vector
161-164 Outline point
171-174 Outline point
L15, L25 Approximation outline

The invention claimed is:

1. A curve rendering device for rendering a curve, having a width and defined by a center line and a line width, by linear approximation of an outline of the curve, the curve rendering device comprising:
a non-transitory memory storing a program; and
a hardware processor that executes the program causing the curve rendering device to operates as:
a segmentation point calculating unit configured to calculate a plurality of segmentation points on the center line for segmenting the center line;
an offset point calculating unit configured to calculate, for each of the segmentation points, two offset points separated from the segmentation point by an equal distance on a normal to the center line at the segmentation point;
a distance calculating unit configured to calculate a distance between offset points in each of two pairs selected from four offset points calculated for two adjacent segmentation points, the offset points in each pair being located on a same side with respect to a straight line connecting the two adjacent segmentation points;
a judging unit configured to calculate a ratio between the calculated two distances using a shorter one of the distances as a denominator, and judge whether or not the ratio is greater than a predetermined value; and
a curve forming unit configured to approximate, between two partial outlines which are portions of the outline delimited at the respective normals at the two adjacent segmentation points, the longer one of the two partial outlines by using a greater number of line segments than line segments used to approximate the shorter one of the two partial outlines when the ratio is judged to be greater than the predetermined value.

2. The curve rendering device according to claim 1, wherein
the offset point calculating unit calculates, as the two offset points separated from the segmentation point by the equal distance, points that are separated from the segmentation point by half the line width.

3. The curve rendering device according to claim 1, wherein
the curve forming unit approximates the shorter partial outline with a single line segment, and
the segmentation point calculating unit segments the center line so that the single line segment approximating the shorter partial outline becomes equal to a predetermined length or shorter.

4. The curve rendering device according to claim 1, wherein
the curve forming unit determines the number of line segments used to approximate the longer partial outline in relation to the ratio calculated by the judging unit.

5. The curve rendering device according to claim 4, wherein
when approximating the longer partial outline, the curve forming unit calculates points $a_n$ and $b_n$ and vectors $s_n$, $t_n$, and $u_n$, with respect to each integer from 1 to d, using following equations:

$a_n = a_{n-1} + 2^{n-1-d}(c_{n-1} - a_{n-1})$;

$b_n = b_{n-1} + 2^{n-1-d}(c_{n-1} - b_{n-1})$;

$s_n = 2^{-d}\{(2^{d-(n-1)} - 1)u_{n-1} + s_{n-1})\}$;

$t_n = 2^{-d}\{(2^{d-(n-1)} - 1)(-u_{n-1}) + t_{n-1})\}$; and $u_n = s_n + (-t_n)$, where
$a_0$ and $b_0$ denote end points of the longer partial outline,
$s_0$ denotes a tangent vector to the center line at the point $a_0$,
$t_0$ denotes an inverse of a tangent vector to the center line at the point $b_0$,
$c_0$ denotes an intersection point of a straight line extending from the point $a_0$ in a direction of the vector $s_0$ and a straight line extending from the point $b_0$ in a direction of the vector $t_0$, and
d denotes a division coefficient,
in the equations, a point $c_n$ denotes an intersection point of a straight line extending from the point $a_n$ in a direction of the vector $s_n$ and a straight line extending from the point $b_n$ in a direction of the vector $t_n$, and
the curve forming unit approximates the longer partial outline with a sequence of straight lines defined by connecting (d+1) points $a_m$ (m is an integer from 0 to d), a point $c_d$, and (d+1) points $b_m$.

6. The curve rendering device according to claim 1, wherein
when one of the two normals intersects with the other at a point between the offset points on the normal, the curve forming unit approximates one of the partial outlines with a plurality of curves irrespective of the judgment by the judging unit, the one of the partial outlines being located on an opposite side from the intersecting point of the normals with respect to a straight line connecting the two adjacent segmentation points.

7. A curve rendering method used in a curve rendering device for rendering a curve, having a width and defined by a center line and a line width, by linear approximation of an outline of the curve, the curve rendering device including a non-transitory memory storing a program and a hardware processor that executes the program causing the curve rendering device to operates as a segmentation point calculating unit, an offset point calculating unit, a distance calculating unit, a judging unit, and a curve forming unit, the curve rendering method comprising the steps of:
a segmentation point calculating step performed by the hardware processor configured to operate as the segmentation point calculating unit to calculate a plurality of segmentation points on the center line for segmenting the center line;
an offset point calculating step performed by the hardware processor configured to operates as the offset point calculating unit to calculate, for each of the segmentation points, two offset points separated from the segmentation point by an equal distance on a normal to the center line at the segmentation point;
a distance calculating step performed by the hardware processor configured to operate as distance calculating unit to calculate a distance between offset points in each of two pairs selected from four offset points calculated for two adjacent segmentation points, the offset points in each pair being located on a same side with respect to a straight line connecting the two adjacent segmentation points;
a judging step performed by the hardware processor configured to operate as the judging unit to calculate a ratio between the calculated two distances using athe shorter one of the distances as a denominator, and judge whether or not the ratio is greater than a predetermined value; and
a curve forming step performed by the hardware processor configured to operate as the curve forming unit to approximate, between two partial outlines which are portions of the outline delimited at the respective normals at the two adjacent segmentation points, athe longer one of the two partial outlines by using a greater number of line segments than line segments used to approximate the shorter one of the two partial outlines when the ratio is judged to be greater than the predetermined value.

8. A non-transitory computer-readable recording medium storing a curve rendering program for causing a computer to function as a curve rendering device that is for rendering a curve, having a width and defined by a center line and a line width, by linear approximation of an outline of the curve, the curve rendering program comprising code for causing the computer to function as:
a segmentation point calculating unit configured to calculate a plurality of segmentation points on the center line for segmenting the center line;
an offset point calculating unit configured to calculate, for each of the segmentation points, two offset points separated from the segmentation point by an equal distance on a normal to the center line at the segmentation point;
a distance calculating unit configured to calculate a distance between offset points in each of two pairs selected from four offset points calculated for two adjacent segmentation points, the offset points in each pair being located on a same side with respect to a straight line connecting the two adjacent segmentation points;
a judging unit configured to calculate a ratio between the calculated two distances using a shorter one of the distances as a denominator, and judge whether or not the ratio is greater than a predetermined value; and
a curve forming unit configured to approximate, between two partial outlines which are portions of the outline delimited at the respective normals at the two adjacent segmentation points, a longer one of the two partial outlines by using a greater number of line segments than line segments used to approximate the shorter one of the two partial outlines when the ratio is judged to be greater than the predetermined value.

9. An integrated circuit used in a curve rendering device for rendering a curve, having a width and defined by a center line and a line width, by linear approximation of an outline of the curve, the integrated circuit comprising:
- a segmentation point calculating circuit configured to calculate a plurality of segmentation points on the center line for segmenting the center line;
- an offset point calculating circuit configured to calculate, for each of the segmentation points, two offset points separated from the segmentation point by an equal distance on a normal to the center line at the segmentation point;
- a distance calculating circuit configured to calculate a distance between offset points in each of two pairs selected from four offset points calculated for two adjacent segmentation points, the offset points in each pair being located on a same side with respect to a straight line connecting the two adjacent segmentation points;
- a judging circuit configured to calculate a ratio between the calculated two distances using the shorter one of the distances as a denominator, and judge whether or not the ratio is greater than a predetermined value; and
- a curve forming circuit configured to approximate, between two partial outlines which are portions of the outline delimited at the respective normals at the two adjacent segmentation points, a longer one of the two partial outlines by using a greater number of line segments than line segments used to approximate the shorter one of the two partial outlines when the ratio is judged to be greater than the predetermined value.

* * * * *